United States Patent [19]

Chang et al.

[11] 4,043,953
[45] Aug. 23, 1977

[54] AMBIENT TEMPERATURE, MOISTURE-CURABLE ACRYLIC-SILANE COATING COMPOSITIONS HAVING IMPROVED POTLIFE

[75] Inventors: Wen-Hsuan Chang, Gibsonia; Marvis E. Hartman, Pittsburgh; Roger L. Scriven, Gibsonia, all of Pa.

[73] Assignee: PPG Industries, Inc., Pittsburgh, Pa.

[21] Appl. No.: 574,194

[22] Filed: May 2, 1975

[51] Int. Cl.$^2$ .............................................. C08L 91/00
[52] U.S. Cl. ........................... 260/18 S; 260/9; 260/13; 260/17.4 R; 260/46.5 UA; 260/46.5 G; 260/46.5 R; 260/67 UA; 260/825; 260/827; 526/14; 526/17; 526/19; 526/23; 526/29; 526/279
[58] Field of Search ............ 260/9, 13, 17.4 R, 18 S, 260/825, 827, 46.5 UA, 46.5 G, 46.5 R, 80 PS, 85.5 R, 86.1, 88.1 R, 88.1 PC, 93.5 R, 67 UA; 526/279, 29, 14, 17, 19, 23

[56] References Cited

U.S. PATENT DOCUMENTS

| 3,317,369 | 5/1967 | Clark et al. ........................ 260/827 |
| 3,453,230 | 7/1969 | Plueddemann ................... 260/80 PS |
| 3,706,697 | 12/1972 | Backderf .............................. 260/827 |
| 3,729,438 | 4/1973 | Plesich et al. ............... 260/46.5 UA |
| 3,755,252 | 8/1973 | Buning et al. ............... 260/46.5 UA |

Primary Examiner—Melvyn I. Marquis
Attorney, Agent, or Firm—Frank J. Troy

[57] ABSTRACT

The potlife of an ambient temperature, moisture-curable coating composition comprising an acrylic-silane interpolymer and a cure-accelerating catalyst is increased by the addition to the composition of from about 0.5 percent to about 15 percent by weight of interpolymer solids of a monomeric hydrolytically reactive organosilicon compound represented by the structural formula:

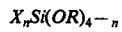

$$X_nSi(OR)_{4-n}$$

wherein X is an organic radical having from 1 to 12 carbon atoms, R is methyl, ethyl, 2-methoxyethyl, 2-ethoxyethyl, or an acyl group containing 5 or less carbon atoms and $n$ is 0, 1 or 2.

24 Claims, No Drawings

AMBIENT TEMPERATURE, MOISTURE-CURABLE ACRYLIC-SILANE COATING COMPOSITIONS HAVING IMPROVED POTLIFE

BACKGROUND OF THE INVENTION

Most coating compositions employed in the coatings industry today require elevated temperatures (e.g., 300° F. to 500° F.) for curing purposes. However, as a result of the long term energy shortage facing the nation, the coatings industry has become increasingly interested in conserving the energy expended in curing coating compositions. This interest on the part of the coatings industry in conserving the energy expended in curing coating compositions has led to extensive activity in the development of coating compositions which are capable of being cured at relatively low temperatures (e.g., 250° F. or less) or which will air-dry (i.e., cure in air) at ambient temperature.

As a result of intensive effort, an ambient temperature, moisture-curable, acrylic-silane coating composition has now been developed, see copending application Ser. No. 516,856, filed Oct. 22, 1974, entitled AMBIENT TEMPERATURE MOISTURE CURABLE ACRYLIC-SILANE COATING COMPOSITIONS, incorporated herein by reference. The coating compositions disclosed in the copending application comprise a blend of an acrylic-silane interpolymer which is devoid of active hydrogen atoms and a cure accelerating catalyst. These coating compositions have an acceptable cure rate and upon curing product films having good physical and chemical properties. However, one important disadvantage of these compositions has been their short potlife, which ranges from about one-half hour to about 3 hours, depending upon the specific cure accelerating catalyst which is utilized, and the amount of moisture in the air in contact with the coating and the moisture content in the coating itself. As described in the copending application, this problem is minimized to some extent by the use of a two-package system wherein one package contains the interpolymer and the other package contains the catalyst with the finished coating composition being mixed just prior to application by admixing the contents of the two packages. Nevertheless, in commercial coating operations, the short potlife of these finished coating compositions creates a significant potential for waste. Accordingly, it would be highly desirable and advantageous if the potlife of the finished coating composition could be substantially increased, thereby reducing this waste potential. This invention accomplishes this advantageous result.

reducing this waste potential. This invention accomplishes this advantageous result.

DETAILED DESCRIPTION OF THE INVENTION

Ambient temperature, moisture-curable coating compositions in which improved potlife is achieved by this invention comprise a blend of an acrylic-silane interpolymer derived from monomers which are devoid of active hydrogen atoms, a cure accelerating catalyst and a monomeric hydrolytically reactive organo-silicon compound repesented by the structural formula:

The acrylic-silane interpolymer component is prepared by interpolymerizing at least one ethylenically unsaturated monomer which is devoid of active hydrogen atoms with an acrylatoalkoxysilane, methacrylatoalkoxysilane or vinyl alkoxysilane monomer.

The ethylenically unsaturated monomer employed in making the interpolymer herein can be virtually any monomer containing at least one

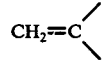

group which is devoid of active hydrogen atoms, i.e., monomers which are devoid of hydroxyl, carboxyl or unsubstituted amide groups. Monomers containing such functional groups should be avoided in preparing the interpolymer since it has been found that such monomers can cause premature gelation of the interpolymer.

Examples of suitable ethylenically unsaturated monomers employed in forming the interpolymer herein include the alkyl acrylates such as methyl acrylate, ethyl acrylate, butyl acrylate, propyl acrylate, 2-ethylhexyl acrylate, and the like; the alkyl methacrylates such as methyl methacrylate, butyl methacrylate, 2-ethylhexyl methacrylate, lauryl methacrylate, and the like; and unsaturated nitriles such as acrylonitrile, methacrylonitrile and ethacrylonitrile. Still other unsaturated monomers which can be used include vinyl aromatic hydrocarbons such as acrolein, styrene, alpha-methyl styrene, vinyl toluene, vinyl acetate, vinyl chloride, and the like, and epoxy functional monomers such as glycidyl methacrylate and the like.

In practice, in order to produce desirable properties in the interpolymer, it is preferred to use combinations of monomers which form hard polymer segments such as styrene, vinyl toluene, and alkyl methacrylates having from 1 to 4 carbon atoms in the alkyl group with monomers which form soft polymer segments such as the alkyl or substituted alkyl esters of acrylic or methacrylic acid, the alkyl groups having from 1 to 13 carbon atoms in the case of acrylic esters and from 5 to 16 carbon atoms in the case of methacrylic esters. Illustrative of monomers which form soft polymer segments are ethyl acrylate, butyl acrylate, 2-ethylhexyl acrylate, 2-ethylhexyl methacrylate, decyl methacrylate, lauryl methacrylate and the like. In addition to the hardening and softening monomers, as previously indicated, other monomers such as vinyl acetate, vinyl chloride, vinyl toluene, acrylonitrile and the like may be included to achieve specific properties in the interpolymer. The interpolymer may contain (i.e., be formed from) about 75 percent to about 98 percent, preferably from 85 to 95 percent, by weight of these ethylenically-unsaturated monomers.

The other component of the interpolymer is an organoalkoxysilane compound. The preferred organoalkoxysilane compounds are the acrylatoalkoxysilanes, such as gamma-acryloxypropyltrimethoxysilane, and the like and the methacrylatoalkoxysilanes, such as gamma-methacryloxypropyltrimethoxysilane, gamma-methacryloxypropyltriethoxysilane, gamma-methacryloxypropyltris(2-ethoxyethoxy)silane and the like. Of these alkoxysilanes, gamma-methacryloxypropyltrimethoxysilane is especially preferred due to its greater reactivity. Vinyl alkoxysilanes such as vinyltrimethoxysilane, vinyltriethoxysilane and vinyl tris(2-methoxyethoxy)silane are less effective than the acrylatoalkoxysilanes or methacrylatoalkoxysilanes, but may be used in some instances.

As indicated, another component of these coating compositions is a cure accelerating catalyst. The cure accelerating catalyst may be an organic acid, such as, for example, p-toluene sulfonic acid, n-butylphosphoric acid, and the like, or a metallic salt of an organic acid such as, for example, tin naphthenate, tin benzoate, tin octoate, tin butyrate, dibutyltin dioctoate, dibutyltin dilaurate, dibutyltin diacetate, iron stearate, lead octoate, and the like, or an organic amine such as, for example, isophorone diamine, methylene dianiline, imidazole and the like. The preferred cure accelerating catalysts are the organotin salts such as dibutyltin dilaurate, dibutyltin diacetate, and the like. The coating compositions may contain from about 0.1 percent by weight to about 5.0 percent by weight, preferably 0.2 percent to 1.0 percent by weight of interpolymer solids of such cure accelerating catalysts.

In addition to the foregoing components, coating compositions which are improved by this invention may contain optional ingredients, including various pigments of the type ordinarily utilized in coatings of this general class. In addition, various fillers, plasticizers, antioxidants, flow control agents, and other such formulating additives may be employed in some instances. The composition is ordinarily contained in a solvent which may be any solvent or solvent mixture in which the materials employed are compatible and soluble to the desired extent.

As indicated, the potlife of ambient temperature, moisture-curable coating compositions which comprise blends of the above-described acrylic-silane interpolymers and cure accelerating catalysts are significantly improved (i.e., increased) by the addition to the compositions of a monomeric hydrolytically reactive organosilicon compound, represented by the structural formula:

$X_nSi(OR)_{4-n}$.

It was surprising to find that organo-silicon compounds represented by the above structural formula as defined hereinafter function to increase the potlife of ambient temperature, moisture-curable acrylic-silane coating compositions in view of the fact that such organo-silicon compounds heretofore have been employed as crosslinking agents for hydroxyfunctional polymers or as the crosslinking monomer component in the preparation of acrylic-silane copolymers and interpolymers. The mechanism by which these organo-silicon compounds serve to increase the potlife of the coating composition is not fully understood. However, it is postulated that these hydrolytically reactive organo-silicon compounds act as moisture scavengers when admixed into the acrylic-silane interpolymer-based coating composition, thereby delaying the reaction between the silane component of the interpolymer and the moisture in the ambient atmosphere.

In the general formula, $X_nSi(OR)_{4-n}$, X is respresentative of a wide variety of organic radicals having from 1 to 12 carbon atoms, including simple alkyl or aryl radicals or functional group-containing radicals wherein the functional group is preferably linked to silicon through carbon atoms.

In the case where X is an alkyl or aryl radical, virtually any hydrocarbon radical containing from 1 to 12 carbon atoms will satisfy X. Thus, X may be aryl radicals such as phenyl, biphenyl, naphthyl, and the like; an alkaryl radical such as tolyl, xylyl, ethylphenyl and the like; an aralkyl radical such as benzyl, phenylethyl and the like; or an alkyl radical having from 1 to 8 carbon atoms, such as methyl, ethyl, propyl, butyl and the like.

X may also be an organic radical containing functional groups such as hydroxyl, mercaptan, epoxy, or glycidyl, ether, amine or diamine, urea, carboxyl, amide, halide, methacrylate or acrylate, vinyl and the like. It is preferred that the above functional group is attached to silicon through a hydrocarbon linkage. Thus, in cases where X is a functional group-containing organic radical, the X unit may be broken down into the components $R_1$ and Y for the sake of convenience. The following is an illustrative example:

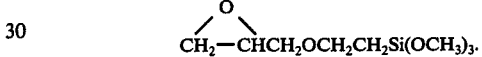

The radical

is a specific example of X; where the "functional group" Y is

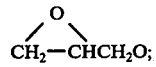

and $R_1$, which links the functional group to silicon is $CH_2CH_2$. Preferably, in the case of functional groups, $R_1$ is an alkylene radical of 0—12 carbon atoms such as ethylene, propylene, butylene, isobutylene and the like; an arylene radical such as phenylene, or naphthalene and the like; a cycloalkylene radical such as cyclohexylene or cyclophenylene and the like. The propylene group is especially preferred.

The following table gives specific illustrations of compounds falling within the general structural formula set forth above.

| Compounds of the Formula $X_nSi(OR)_{4-n}$ | n | R | X |
|---|---|---|---|
| 1. $CH_3Si(OCH_3)_3$ | 1 | $CH_3$ | $CH_3$ |
| 2. $C_6H_5Si(OCH_3)_3$ | 1 | $CH_3$ | $C_6H_5$ |
| 3. $CH_3(C_6H_5)Si(OCH_3)_2$ | 2 | $CH_3$ | $C_6H_5, CH_3$ |
| 4. $CH_3CH_2CH_2CH_2Si(OCH_3)_3$ | 1 | $CH_3$ | $C_4H_9$ |
| 5. $CH_2=CH(OCH_2CH_3)_3$. | 1 | $C_2H_5$ | $CH_2=CH$ |
| 6. $HOCH_2CH_2CH_2Si(OCH_3)_3$ | 1 | $CH_3$ | $HOC_3H_6$ |
| 7. $ClCH_2CH_2CH_2Si(OCH_3)_3$ | 1 | $CH_3$ | $ClC_3H_6$ |
| 8. $HSCH_2CH_2CH_2Si(OCH_3)_3$ | 1 | $CH_3$ | $HSC_3H_6$ |
| 9. $H_2NCH_2CH_2CH_2Si(OCH_2CH_3)_3$ | 1 | $C_2H_5$ | $H_2NC_3H_6$ |
| 10. $H_2NCH_2CH_2NHCH_2CH_2CH_2Si(OCH_3)_3$ | 1 | $CH_3$ | $H_2NC_2H_4NHC_3H_6$ |
| 11.  $CH_2$—$CHCH_2OCH_2CH_2Si(OCH_3)_3$ | 1 | $CH_3$ |  $CH_2$—$CHCH_2OC_2H_4$ |

-continued

| Compounds of the Formula $X_nSi(OR)_{4-n}$ | n | R | X |
|---|---|---|---|
| 12. [epoxycyclohexyl]-CH$_2$CH$_2$Si(OCH$_3$)$_3$ | 1 | CH$_3$ | [epoxycyclohexyl]-CH$_2$CH$_2$ |
| 13. HOCH$_2$CH$_2$OCNHCH$_2$CH$_2$Si(OCH$_2$CH$_2$)$_3$ (with C=O) | 1 | CH$_3$ | HOC$_2$H$_4$OCNHC$_3$H$_6$ (with C=O) |
| 14. HO—[phenyl]—Si(OCH$_3$)$_3$ | 1 | CH$_3$ | HOC$_6$H$_5$ |
| 15. Si(OCH$_2$CH$_2$OCH$_2$CH$_3$)$_4$ | 0 | C$_2$H$_4$OC$_2$H$_5$ | — |
| 16. Si(OCH$_3$)$_4$ | 0 | CH$_3$ | — |
| 17. Si(OCH$_2$CH$_3$)$_4$ | 0 | C$_2$H$_5$ | — |
| 18. CH$_2$=CHSi(OCCH$_3$)$_3$ (with C=O) | 1 | OCCH$_3$ (with C=O) | CH$_2$=CH |

*Compound Nos. 5–18 further illustrate compounds in which X consists of R$_1$ or Y components, or both. Thus, for example, in Compound No. 5, X is equivalent to the Y (i.e., functional group) component = CH; in Compound No. 6, X contains the R$_1$ component C$_3$H$_6$ and the Y component OH; in Compound No. 7, X contains the R$_1$ component C$_3$H$_6$ and the Y component Cl, and so forth.

In the formula $X_nSi(OR)_{4-n}$, R may be methyl, ethyl, 2-methoxyethyl, 2-ethoxyethyl or an acyl group with 5 or less carbon atoms. Preferred groups are methyl, 2-methoxyethyl, 2-ethoxyethyl and acyl. See the above table for illustrations.

In the formula, the value of n may be 0, 1 or 2 where 0 and 1 are preferred.

A considerable number of compounds falling within the scope of the above-described general formula have heretofore been illustrated. Among the preferred compounds illustrated by the general formula are compounds such as phenyltrimethoxysilane, phenyltriethoxysilane, vinyltriacetoxysilane, Cellosolve silicate (a partially condensed 2-ethoxyethyl ester of silicic acid) and methyl silicate. Of these compounds, the most preferred compounds are Cellosolve silicate, methyl silicate and phenyltrimethoxysilane.

For convenience sake, the above-described organosilicon compounds which serve to improve the potlife of the coating compositions herein are hereinafter referred to simply as stabilizers. The amount of such stabilizers which may be employed in the coating compositions will vary somewhat, depending upon the specific stabilizer and cure accelerating catalyst employed, but in general, the amount of stabilizer used will range from about 0.5 percent to about 15 percent by weight of interpolymer solids with a preferred amount being from 1 percent to 5 percent by weight of interpolymer solids.

The term "potlife" as employed throughout this specification and claims refers to the period of time in which the interpolymer component of the coating composition remains in an ungelled state under specified storage conditions. The potlife of the coating compositions herein is determined by measuring at specified storage conditions the time (i.e., hours, days, weeks, or months) required for the interpolymer to gel (i.e., the gel time). The gel time evaluation is a well known test in the coating arts and is regarded as an acceptable measure of the potlife of coating compositions.

The improved compositions herein can be applied by any conventional method, including brushing, dipping, flow coating, etc., but they are most often applied by spraying. Conventional spray techniques and equipment are utilized. The compositions may be applied over a wide variety of substrates, such as wood, metals, glass, cloth, plastics, foam and the like, as well as over primers.

The Examples which follow are submitted for the purpose of further illustrating the nature of the present invention and should not be regarded as a limitation on the scope thereof. Unless otherwise specified, all parts and percentages shown in the examples are by weight.

EXAMPLE A

This example illustrates the preparation of an acrylic-silane interpolymer component of the improved compositions of the invention.

To a 5-liter flask equipped with a stirrer, thermometer, nitrogen inlet, dropping funnel and a condenser equipped with a water trap was added a mixture of 400 grams of methyl-n-butyl ketone and 400 grams of VM&P naphtha. The mixture was heated to reflux and a solution consisting of 900 grams of methyl methacrylate, 255 grams of butyl methacrylate, 150 grams of 2-ethylhexyl acrylate, 120 grams of acrylonitrile, 75 grams of gamma-methacryloxypropyltrimethoxysilane, 600 grams of methyl-n-butyl ketone and 10 grams of azobis(isobutyronitrile) was added dropwise over a period of 3 hours. (Based on solids weight, the monomer charge consists of 60 percent methyl methacrylate, 17 percent butyl methacrylate, 10 percent 2-ethylhexyl acrylate, 8 percent acrylonitrile and 5 percent gamma-methacryloxypropyltrimethoxysilane.) After this monomer addition was complete, a solution consisting of 150 grams of methyl-n-butyl ketone, 150 grams of VM&P naphtha and 5 grams of azobis(isobutyronitrile) was added dropwise to the reaction mixture over a period of one hour. Immediately after this addition was completed, 4.8 grams of butyl peroxyisopropyl carbonate was added to the reaction mixture. Four hours later, another 4.8 grams of butyl peroxyisopropyl carbonate was added to the reaction mixture. After a total reaction time of about 12 hours, the reaction mixture was cooled to room temperature.

The resultant acrylic-silane interpolymer solution had a solids content determined at 150° C. of 46.5 percent and a Gerdner-Holdt viscosity measured at 25° C. of S-T.

EXAMPLE B

An acrylic-silane interpolymer was prepared using substantially the same procedure employed in Example A except that the monomer charge consisted of 50 percent ethyl acrylate, 35 percent isobutyl methacrylate, 5 percent methyl acrylate, 5 percent acrylonitrile and 5 percent gammamethacryloxypropyltrimethoxysilane.

The resultant interpolymer solution has a solits content measured at 150° C. of 49.6 percent and a Gardner-Holdt viscosity measured at 25° C. of I+.

EXAMPLES 1-4

These examples illustrate the improved potlife achieved by adding the stabilizers of this invention to an ambient temperature, moisture-curable coating composition comprising a blend of the acrylic-silane interpolymer of Example A and a cure accelerating catalyst. In these examples, the interpolymer of Example A was first blended with dibutyltin dilaurate cure accelerating catalyst to form a composition which served as a control (Example 1) and a base to which the stabilizers were added. Cellosolve silicate (Example 2), methyl silicate (Example 3) and vinyl triacetoxysilane (Example 4) were added as stabilizers to the control formulation to form the test formulations. The finished compositional formulations were as follows:

|  | PARTS BY WEIGHT | | | |
|---|---|---|---|---|
|  | 1 | 2 | 3 | 4 |
|  | (Control) | | | |
| Acrylic-silane interpolymer solution of Example A | 200.0 | 200.0 | 200.0 | 200.0 |
| Dibutyltin dilaurate (catalyst) | 1.0 | 1.0 | 1.0 | 1.0 |
| Cellosolve silicate (stabilizer) | — | 3.0 | — | — |
| Methyl silicate (stabilizer) | — | — | 3.0 | — |
| Vinyl triacetoxysilane (stabilizer) | — | — | — | 5.0 |
| Total | 201.0 | 204.0 | 204.0 | 206.0 |

The samples of the above compositions were then evaluated for gel time (i.e., potlife) at room temperature and 120° F. In order to eliminate the effect of moisture variations in the atmosphere, the samples were stored in capped viscosity tubes. Test results are shown in Table I.

TABLE I

| Example No. | Gel Times (*) | |
|---|---|---|
|  | Room Temperature | 120° F. |
| 1 (Control) | <16 hours | ~2 hours |
| 2 | 20 days | 16 hours |
| 3 | 35 days | 16 hours |
| 4 | 30 days | 6 days |

(*) The gel tims reflect the appearance of a gel skin on the surface of the resin.

EXAMPLES 5-13

These examples illustrate the effect of variations in the amounts of cure accelerating catalyst and stabilizers on the gel times of the coating composition. The compositions were produced and tested in accordance with the procedure and methods set forth in Examples 1-4.

Composition formulations and test results are shown in Table II.

TABLE II

|  | PARTS BY WEIGHT EXAMPLE No. | | | | | | | | |
|---|---|---|---|---|---|---|---|---|---|
|  | 5 | 6 | 7 | 8 | 9 | 10 | 11 | 12 | 13 |
|  | (Control) | | | | | | | | |
| Interpolymer solution of Example A | 200.0 | 200.0 | 200.0 | 200.0 | 200.0 | 200.0 | 200.0 | 200.0 | 200.0 |
| Dibutyltin dilaurate | 1.0 | 1.0 | 0.5 | 0.5 | 1.0 | 0.5 | 1.0 | 0.5 | 0.5 |
| Cellosolve silicate | — | 5.0 | 3.0 | 5.0 | — | — | — | — | — |
| Methyl silicate | — | — | — | — | 10.0 | 3.0 | — | — | — |
| Vinyl triacetoxysilane | — | — | — | — | — | — | 10.0 | 10.0 | 5.0 |
| GEL TIMES |  |  |  |  |  |  |  |  |  |
| Room Temperature | 16 Hrs. | 40 days | 23 days | 40 days | 60 days+ | 35 days | 60 days | 40 days | 30 days |
| 120° F. | ~2 Hrs. | 5 days | 7 days | 10 days | 60 days+ | 16 hrs. | 43 days | 35 days | 6 days |

EXAMPLES 14-17

These examples further illustrate the improved potlife achieved by adding the stabilizers of this invention to ambient temperature, moisture-curable coating compositions comprising an acrylic-silane interpolymer and a cure-accelerating catalyst. In these examples, the interpolymer of Example B was first blended with dibutyltin dilaurate cure accelerating catalyst to form a composition which served as a control (Example 14) and also as a base composition to which phenyltrimethoxysilane stabilizer was added (Examples 15-17). Composition formulations and test results are shown in Table III.

TABLE III

|  | PARTS BY WEIGHT EXAMPLE NO. | | | |
|---|---|---|---|---|
|  | 14 | 15 | 16 | 17 |
| Acrylic-silane interpolymer solution of Example B | 200.00 | 200.00 | 200.00 | 200.00 |
| Dubutyltin dilaurate | 0.25 | 0.25 | 0.25 | 0.25 |
| Phenyltrimethoxysilane | — | 1.00 | 3.00 | 5.00 |
| Methyl isobutyl ketone | 200.00 | 200.00 | 200.00 | 200.00 |
| Gel Times |  |  |  |  |
| Room temperature | 16 hours | 24 hours | 4 days | 7 days |

According to the provisions of the Patent Statutes, there is described above the invention and what are now considered to be its best embodiments. However, within the scope of the appended claims, it is to be understood that the invention can be practiced otherwise than as specifically described.

We claim:

1. In an ambient temperature, moisture-curable coating composition which includes:
   A. an acrylic-silane interpolymer of:
      1. at least one ethylenically unsaturated monomer which contains

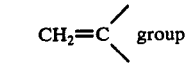

group and is devoid of active hydrogen atoms; and 2. a copolymerizable organoalkoxysilane selected from the group consistng of acrylatoalkoxysilanes, methacrylatoalkoxysilanes and vinylalkoxysilanes; and B. a cure accelerating catalyst; the improvement which comprises the addition of:

C. from about 0.5 percent to about 15 percent by weight of interpolymer solids of a monomeric hydrolytically reactive organosilicon stabilizer represented by the formula:

$$X_nSi(OR)_{4-n}$$

wherein X is an organic radical having from 1 to 12 carbon atoms, R may be methyl, ethyl, 2-methoxymethyl, 2-ethoxyethyl or an acyl group containing 5 or less carbon atoms and $n$ is 0, 1 or 2.

2. The coating composition of claim 1 wherein said ethylenically unsaturated monomer is selected from the group consisting of alkyl acrylates, alkyl methacrylates, vinyl aromatic hydrocarbons and mono-unsaturated organic nitriles.

3. The coating composition of claim 2 wherein the alkyl acrylate is selected from the group consisting of ethyl acrylate, propyl acrylate, butyl acrylate, and 2-ethylhexyl acrylate.

4. The coating composition of claim 2 wherein the alkyl methacrylate is selected from the group consisting of methyl methacrylate, lauryl methacrylate, butyl methacrylate and isobutyl methacrylate.

5. The coating composition of claim 2 wherein the vinyl aromatic hydrocarbon is selected from the group consisting of styrene, vinyl toluene, and alpha-methylstyrene.

6. The coating composition of claim 2 wherein the monounsaturated organic nitrile is selected from the group consisting of acrylonitrile, methacrylonitrile and ethacrylonitrile.

7. The coating composition of claim 1 wherein the methacrylatoalkoxysilane is selected from the group consisting of gammamethacryloxypropyltrimethoxysilane, gamma-methacryloxypropyltriethoxysilane and gamma-methacryloxypropyltris(2-ethoxyethoxy)silane.

8. The coating composition of claim 1 wherein the methacrylatoalkoxysilane is gamma-methacryloxypropyltrimethoxysilane.

9. The coating composition of claim 1 wherein the vinylalkoxysilane is selected from the group consisting of vinyltrimethoxysilane, vinyltriethoxysilane and vinyltris(2-ethoxyethoxy)silane.

10. The coating composition of claim 1 wherein the vinylalkoxysilane is vinyltrimethoxysilane.

11. The coating composition of claim 1 wherein the cure accelerating catalyst is selected from the group consisting of an organic acid, a metallic salt of an organic acid and mixtures thereof.

12. The coating composition of claim 11 wherein the organic acid is p-toluene sulfonic acid.

13. The coating composition of claim 11 wherein the organic acid is n-butylphosphoric acid.

14. The coating composition of claim 11 wherein the metallic salt is dibutyltin dilaurate.

15. The coating composition of claim 11 wherein the organic base is isophorone diamine.

16. The coating composition of claim 1 wherein said organic radical X is an alkyl radical, aryl radical or an organic radical containing functional groups wherein said functional group is linked to silicon through a hydrocarbon linkage.

17. The coating composition of claim 16 wherein said alkyl radical is an alkyl radical having from 1 to 12 carbon atoms.

18. The coating composition of claim 16 wherein said aryl radical is selected from the group consisting of phenyl, bisphenyl and naphthyl.

19. The coating composition of claim 16 wherein the functional group of the functional group containing radical may be hydroxyl, mercaptan, epoxy, glycidyl, ether, amine, diamine, urea, carboxyl, amide, halide, or vinyl.

20. The coating composition of claim 1 wherein said stabilizer is methyl silicate.

21. The coating composition of claim 1 wherein said stabilizer is a partially condensed 2-ethoxyethyl ester of silicic acid.

22. The coating composition of claim 1 wherein said stabilizer is phenyltrimethoxysilane.

23. The coating composition of claim 1 wherein said stabilizer is vinyltriacetoxysilane.

24. The ambient temperature, moisture-curable coating composition of claim 1 wherein said interpolymer (A) consists essentially of from about 75 percent to about 98 percent by weight of said unsaturated monomer and from about 2 percent to about 25 percent by weight of said organoalkoxysilane; said cure accelerating catalyst (B) is present in said composition in an amount of from about 0.1 percent to about 5.0 percent by weight of interpolymer solids and said organo-silicon stabilizer (C) is present in said composition in an amount of from about 0.5 percent to about 15 percent by weight of interpolymer solids.

* * * * *